(12) United States Patent
Aleksandersen et al.

(10) Patent No.: US 7,909,065 B2
(45) Date of Patent: Mar. 22, 2011

(54) PRE-TENSIONED SEALING MEANS ARRANGEMENT

(75) Inventors: Jostein Aleksandersen, Randaberg (NO); Harald Syse, Røyneberg (NO)

(73) Assignee: TDW Offshore Services AS, Stavanger (NO)

( * ) Notice: Subject to any disclaimer, the term of this patent is extended or adjusted under 35 U.S.C. 154(b) by 374 days.

(21) Appl. No.: 12/097,417

(22) PCT Filed: Dec. 6, 2006

(86) PCT No.: PCT/NO2006/000466
§ 371 (c)(1),
(2), (4) Date: Jun. 13, 2008

(87) PCT Pub. No.: WO2007/073197
PCT Pub. Date: Jun. 28, 2007

(65) Prior Publication Data
US 2008/0295910 A1 Dec. 4, 2008

(30) Foreign Application Priority Data

Dec. 19, 2005 (NO) .................................. 20056024
Apr. 12, 2006 (NO) .................................. 20061670

(51) Int. Cl.
*F16L 55/11* (2006.01)
(52) U.S. Cl. ............. 138/89; 138/90; 138/93; 405/170
(58) Field of Classification Search .............. 138/89, 138/90, 93, 97; 405/170
See application file for complete search history.

(56) References Cited

U.S. PATENT DOCUMENTS

| 3,667,640 | A | | 6/1972 | Morrow | |
|---|---|---|---|---|---|
| 3,693,408 | A | * | 9/1972 | Hyde | 73/49.8 |
| 3,886,977 | A | * | 6/1975 | Dorgebray | 138/89 |
| 4,381,800 | A | * | 5/1983 | Leslie | 138/90 |
| 4,465,104 | A | * | 8/1984 | Wittman et al. | 138/89 |
| 4,817,671 | A | | 4/1989 | Mathison et al. | |
| 4,875,615 | A | * | 10/1989 | Savard | 228/119 |

(Continued)

FOREIGN PATENT DOCUMENTS

| DE | 2336170 | 2/1975 |
|---|---|---|
| GB | 1092636 | 11/1967 |

OTHER PUBLICATIONS

PCT Patent Office, "Written Opinion of the International Searching Authority," PCT Patent Office.

*Primary Examiner* — Patrick F Brinson
(74) *Attorney, Agent, or Firm* — Gable Gotwals

(57) ABSTRACT

The present invention regards a barrier plug system (3) for sealing off a pipe (1), comprising a plug body, a first and a second end plate surface (11, 31) arranged on opposite sides of the plug body and at least one circumferential sealing means (6) and means (8) for setting the plug system (3). The plug body comprises at least two separate plug body elements (10, 30) movable relative each other and the at least one sealing means (6) is arranged abutting two opposite annular pressing surfaces (12, 32) formed by the plug body, which are moved towards each other during setting of the plug system (3). The pressing surfaces (12, 32) are limited in the movement against each other by stop means and pre-tensioned to move toward each other by at least one tensioning device (7).

17 Claims, 5 Drawing Sheets

U.S. PATENT DOCUMENTS

Figure 1:
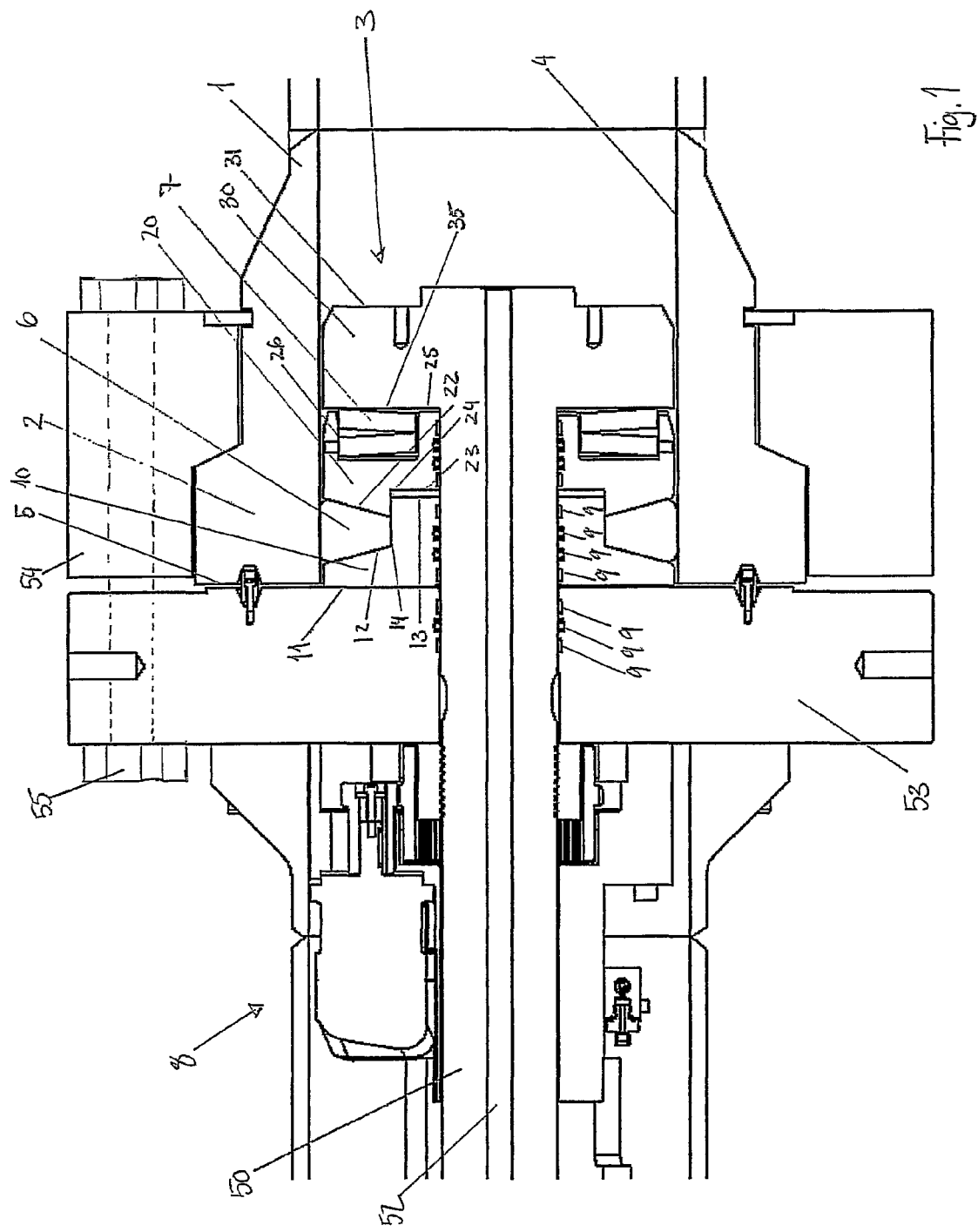

| | | | |
|---|---|---|---|
| 4,991,651 A * | 2/1991 | Campbell | 166/122 |
| 5,293,905 A * | 3/1994 | Friedrich | 138/89 |
| 5,924,454 A * | 7/1999 | Dyck et al. | 138/89 |
| 6,581,642 B1 * | 6/2003 | Ritchie et al. | 138/90 |
| 6,732,762 B2 * | 5/2004 | Russell | 138/89 |
| 7,171,987 B2 * | 2/2007 | Serret | 138/89 |
| 2004/0168734 A1 * | 9/2004 | Serret | 138/89 |
| 2009/0272451 A1 * | 11/2009 | Aleksandersen et al. | 138/89 |

\* cited by examiner

PRE-TENSIONED SEALING MEANS ARRANGEMENT

CROSS-REFERENCE TO PENDING APPLICATIONS

This application is based on PCT Patent Application No. NO2006/000466, filed on Dec. 6, 2006, which was based on Norwegian Patent Application Nos. 20056024, filed on Dec. 19, 2005 and 20061670, filed Apr. 12, 2006.

The present invention regards a plug sealing system for sealing engagement internally within a pipe.

There are known several solutions for providing temporary barriers within a pipeline. This temporary barrier may be removed after a short while or after years. Such a barrier may for instance be a plug similar to the Applicant's own plug system described in Norwegian Patent No. 316,740.

Such a plug sealing system is formed to make a sealed connection between the pipe and the plug, this may be done by pressing packers into engagement with the inner wall of the pipeline, by pulling the end plates of the plug together by for instance a fluid operated cylinder and with a given pressure difference across the plug it may be self locking. Usually the fluid operated cylinder is used only during the setting procedure, after setting of the plug it is kept set with the pressure differential across the plug. By equalizing the pressure difference across the plug it is released.

In some cases there are pressure fluctuations in the system, which creates the challenge of making sure there is a constant good sealing contact between plug and pipeline. One may use the fluid operated cylinder to regulate this, but that would necessitate a power source to operate the systems, which isn't a good solution for plugs that should be barriers for several years before removed. There is therefore a need to find a solution to make these self-locking plugs less dependent on the pressure difference across the plug.

Another issue relates to that the existing self locking systems are set with a defined high pressure side and a low pressure side to make the self-locking work. In some cases the high and low pressure sides of a plug may vary, for instance when working on large water depths. This gives a need for a system independent on which is the low and high pressure side of the plug.

There is a further issue which is that the known plug only gives a single barrier. To create a double barrier there has to be positioned two plugs in series, and this will demand a given length of pipeline. In some cases there is not available the necessary length to set two plug systems as this, in series after each other. There is therefore a need for a system creating a double barrier, which takes up less room than this known system.

There are know other plug systems as for instance described in U.S. Pat. No. 4,817,671, which describes a single barrier plug system for positioning within a pipe and anchored to a pipe end flange. In U.S. Pat. No. 4,381,800 there is described a system with two o-rings and a seal packer. In this system there is also only one barrier which is pressure dependent, i.e. the seal packer. These systems do not solve the problem with the need of a double barrier system, neither do they provide a safe and reliable self-locking system, which system in addition is independent on which side has the higher pressure.

It is therefore an aim to provide a barrier system that is set and responsive to the external pressure difference across the barrier, while at the same time is not only dependent on pressure difference across the barrier. It is also an aim to provide a system which is independent on which end is the high and low pressure side of the system. It is also an aim to provide a system that gives good sealing and that is adaptable to different pressure differences across the system. It is also an aim to provide a system which occupies a short distance within the pipe at the same time creating a double barrier. An aim is also to provide a double barrier system operated by one setting tool, where the barriers are separate, making it possible to maintain one barrier if the other barrier fails.

The present invention regards a barrier plug system for sealing off a pipe, comprising a plug body, comprising a first and a second end plate surface arranged on opposite sides of the plug body and at least one circumferential sealing means, i.e. a packer, arranged between the two end plate surfaces. The system further comprises means for setting the plug system within a pipe by moving the end plate surfaces towards each other, and thereby regulating the pressure in the packer.

By sealing off a pipe one should understand sealing off between two parts of a pipe or sealing off an end of a pipe, i.e. creating at least one barrier. The first and second end plate surfaces will be exposed to the pressure of the fluids at the two separated sides of the plug, which means the fluid at the two sides of the barrier within a pipeline or a fluid within the pipeline and the fluid at the outside of the pipeline in the case the plug system is used to seal off an end of a pipeline. The sealing means, i.e the packer in this plug system is responsive to the pressure difference across the plug system, i.e. the pressure of the packer onto the internal wall of the pipe depends one the pressure difference across the plug system, the pressure difference from one side of the plug to the other side of the plug.

According to the invention the plug body comprises at least two, preferably at least three separate elements movable relative each other and the two end plate surfaces are arranged on two different elements movable relative each other. These two plug body elements each comprising one of the end plate surfaces, form so called end plates of the plug system.

The at least one sealing means is arranged abutting two opposite annular shaped pressing surfaces, each formed by a plug body element, which pressing surfaces are moved toward each other by the setting tool during setting of the plug system. The plug body element comprising a pressing surface, may also comprise an end plate surface, having the end plate surface on one side and a pressuring surface on the opposite site of the element.

According to the invention the two co-operating pressing surfaces are limited in the movement against each other by stop means and pre-tensioned to move toward each other by at least one tensioning device. The tensioning device is preferably arranged between two elements of the plug body, but may in one embodiment also be arranged between a plug body element and an element able to be fixated relative the pipe. This may in one embodiment be that the tensioning device may be arranged between a plug body element and a surface formed by a part of the setting means.

The tensioning device is set with a predetermined tension in a set position of the plug system, giving a preset pressure acting on the sealing means, packer, even if there is no pressure difference across the plug system. The plug system is as said preferably a pressure responsive and self-locking system, dependent on the pressure difference across the plug system. By having the tensioning device there is in a set position of the system always provided a given pre-tension in the sealing means in the system, independent on the pressure difference across the plug system. This is especially preferably in pipe system where there are pressure fluctuations in the pipe system and one ensures a sealing connection independent on high and low pressure side around the plug system.

According to an aspect of the invention there may be more than one sealing means. In an embodiment with two sealing means the plug body comprises two separate plug body elements arranged between two sealing means with at least one tensioning device arranged between the two plug body elements. The plug body will in this example comprise four plug body elements, two elements each comprising an end plate having an end plate surface, and two intermediate elements. The sealing means will be arranged between a pressing surface formed on a plug body element comprising an end plate surface and a pressing surface arranged on an intermediate element. With such an arrangement one achieves a double barrier system, set with one setting tool, which system is partly independent on high and low pressure side and at the same time will keeps a pre-tension on the sealing means independent on the pressure difference across the plug system, and at the same time a two barrier system, that will keep one barrier even if one barrier fails. In another embodiment the plug body may comprise five plug body elements, with a tensioning device between an end plate surface plug body element and a second plug body element comprising a pressing surface, pressing against a sealing means, with an middle element with two opposite pressing surfaces pressing against the first and second sealing means, and a fourth plug body element with a tensioning device between this and the second end plate forming the fifth element. There are several configurations with different number of plug body elements that will achieve the intended effect.

According to an aspect of the invention the plug system is attached to an anchoring device, for fixating of the plug system relative a pipe. This anchoring device may comprise an end flange system being able to be fixated relative the pipe, by being attachable to an end flange of a pipe or by being connected to gripping means for gripping the internal wall of a pipe, preferably in the form of slips movable along a conical surface for radial movement. The anchoring device may also form part of the means for setting the plug system, and thereby the setting tool of the means for setting the plug system. Different embodiment will be explained below.

The tensioning device for pre-tension of the sealing means, comprises an elastic element as a spring element or a packer, or a fluid cylinder or a combination of these elements. The fluid cylinder may be a gas operated fluid cylinder or a liquid operated cylinder connected to a accumulator. The pre-tension of the tensioning device will vary dependent on the pressure range for which the plug system shall be used. According to an aspect at least one of the plug body elements interacting with a tensioning means, comprises a groove for arranging the tensioning means, making a surfaces of the plug body element around the tensioning means possibly abut against an adjacent element in the form of a plug body element or an element fixated relative the pipe in a set configuration, in a normal setting of the plug system.

According to an aspect of the invention the stop means comprises stop surfaces formed on the two elements forming the two cooperating pressing surfaces around one sealing means. In one embodiment these stop surfaces may be formed by a part of the pressing surfaces, in another embodiment the stop surfaces are separate from the pressing surfaces and arranged radial within, or radial internally of the pressing surfaces. Cooperating stop surfaces will during normal procedures of the plug system not abut against each other, but will abut against each other when they act as a stop means for further movement of the end plate surfaces toward each other, for instance if one sealing means out of two sealing means are failing.

According to an aspect a pressing surface and a stop surface which are arranged radial within each other on one plug body element, are connected by a transition surface. This transition surface extends in one embodiment mainly parallel with a longitudinal axis of the plug system and the stop surface extends in a mainly radial direction. The transition surface of one of the two co-operating plug body elements around one sealing means forms an outwards facing surface and the transition surface of the other plug body element forms an inwards facing surface.

The pressing surfaces are made with an orientation with an angle other than zero relative a longitudinal axis of the plug system, mainly corresponding to a longitudinal axis of a pipeline at the position where the plug system will be set. Two co-operating pressing surfaces around one sealing means will preferably have an angle equal to x and 180−x degrees relative to a longitudinal axis of the plug system, where x can be but preferably is less than 90 degrees, giving a V-shaped form of the two cooperating surfaces. The transition surface of one of the plug body elements, which transition surface, is faced outwards may also form a support surface for the sealing means radial within the sealing means. A part of the transition surface will during the setting of the plug system, be moved away from the sealing means and covered by the transition surface of the co-operating plug body element. The transition surface may form one plane or have another form or form a repetitive pattern around a circumference, where the co-operating transition surfaces have corresponding form.

According to the invention the means for setting the plug system comprises a setting tool comprising a mechanically and or a fluid operated tool. In an aspect of the invention the setting tool comprises at least one stem extending from the plug body element comprising an end plate surface, through the whole plug body system and through another end plate surface. This stem is there connected with the rest of the setting tool. The setting tool will by activation move the end surfaces towards each other by pressing them together, and thereby pressing the sealing means into sealing engagement with an inner wall of the pipe. The other plug body elements are arranged separately movable along the at least one stem, between the plug body element comprising the end plate surface farthest away from the setting tool and the rest of the setting tool. The setting tool may comprise parts or elements forming part of the plug system and which parts or elements are left with the plug system after the plug system is set within a pipeline. In addition to this the setting tool may also comprise part or elements used during the setting procedure of the plug system, which parts or elements may be removed from the plug system after the plug system is set. These parts may when the plug should be released, be re-connected to the plug system for releasing the plug system.

According to an aspect the setting tool may comprises an anchoring element. This anchoring element is anchored and fixated relative the pipeline, which anchoring element also may form the anchoring of the plug system. The setting tool may be formed in such a manner that the stem of the setting tool is movable relative the anchoring element, and the setting tool allowing movements of these elements relative each other in one first direction along the longitudinal axis and preventing movement beyond a point in the other direction. The first direction is a direction moving the end plate surface farthest away from the anchoring element, closer to the anchoring element and the other limited direction is opposite.

This gives a given maximum distance between the anchoring element and this end plate surface when the setting tool is activated. This functionality with the fact that both end plate surfaces are exposed to the surrounding fluid on respective ends of the plug system gives a system independent on high and low pressure side of the plug system. The pressure on the packer means will be dependent on pressure on either side of the plug system according to this aspect. The system will have a sealing engagement with the inner wall of the pipe independent on which side has the higher pressure and also with a non-pressure difference across the plug, due to the pre-tension of the sealing means.

According to another aspect there might within at least one stem be provided a fluid line, connecting an area between two sealing means with a source of fluid at one end of the plug system, for testing the sealing means when the plug system is activated within a pipeline. There might also be provided a through going fluid channel through the plug system, which fluid channel comprises a control valve.

These aspects of the invention give a plug barrier system which fulfilled the aims.

Figure 2:
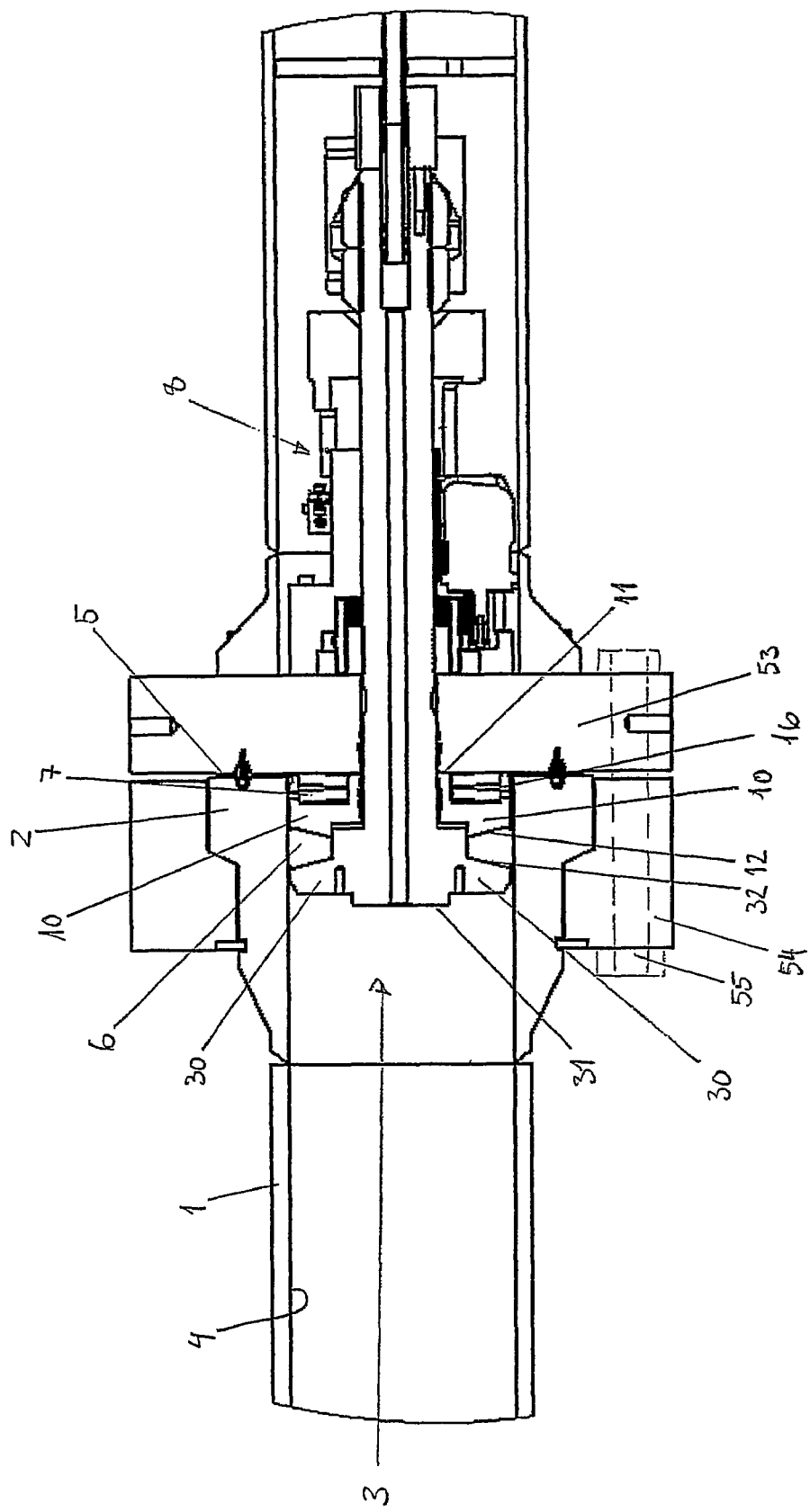
Figure 3:
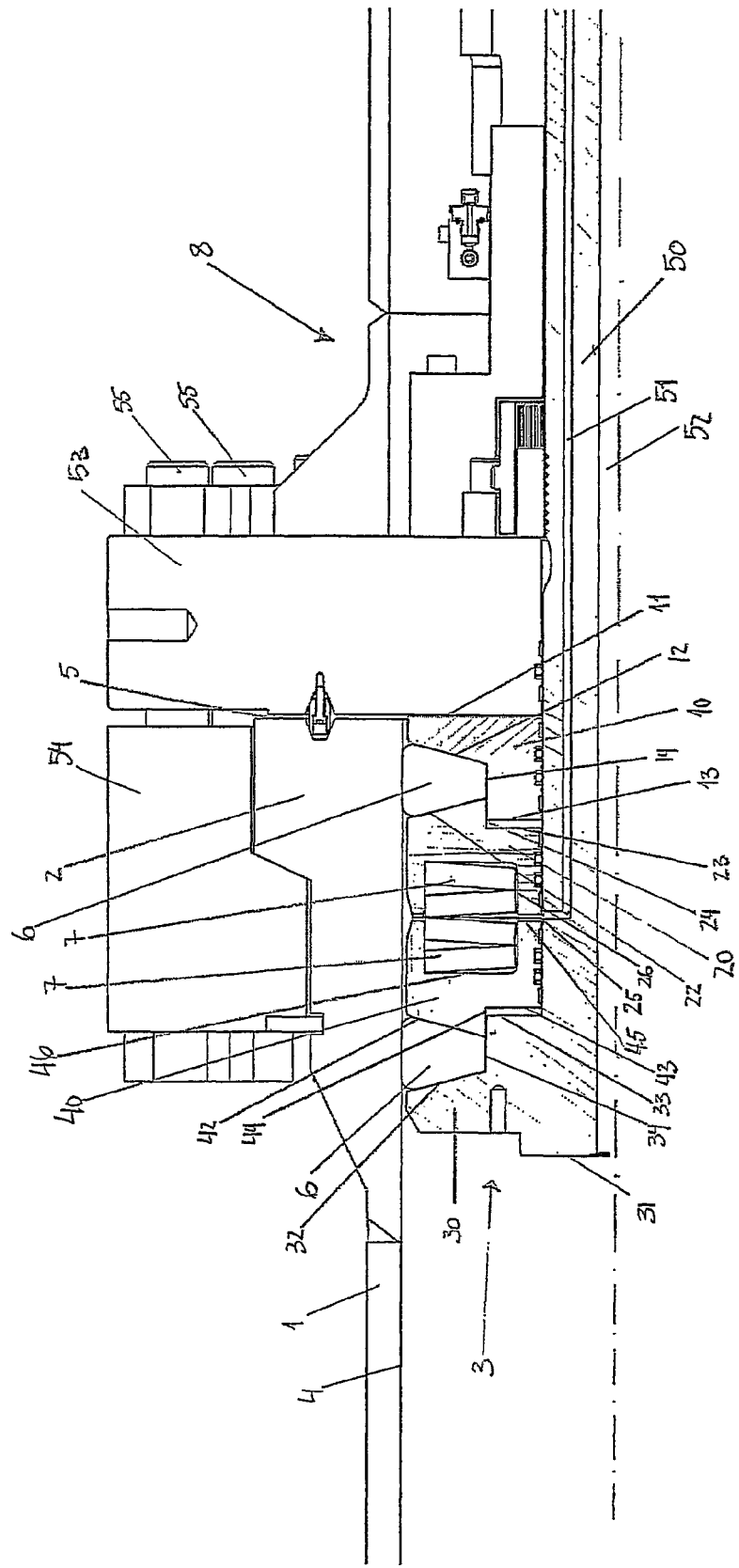
Figure 4:
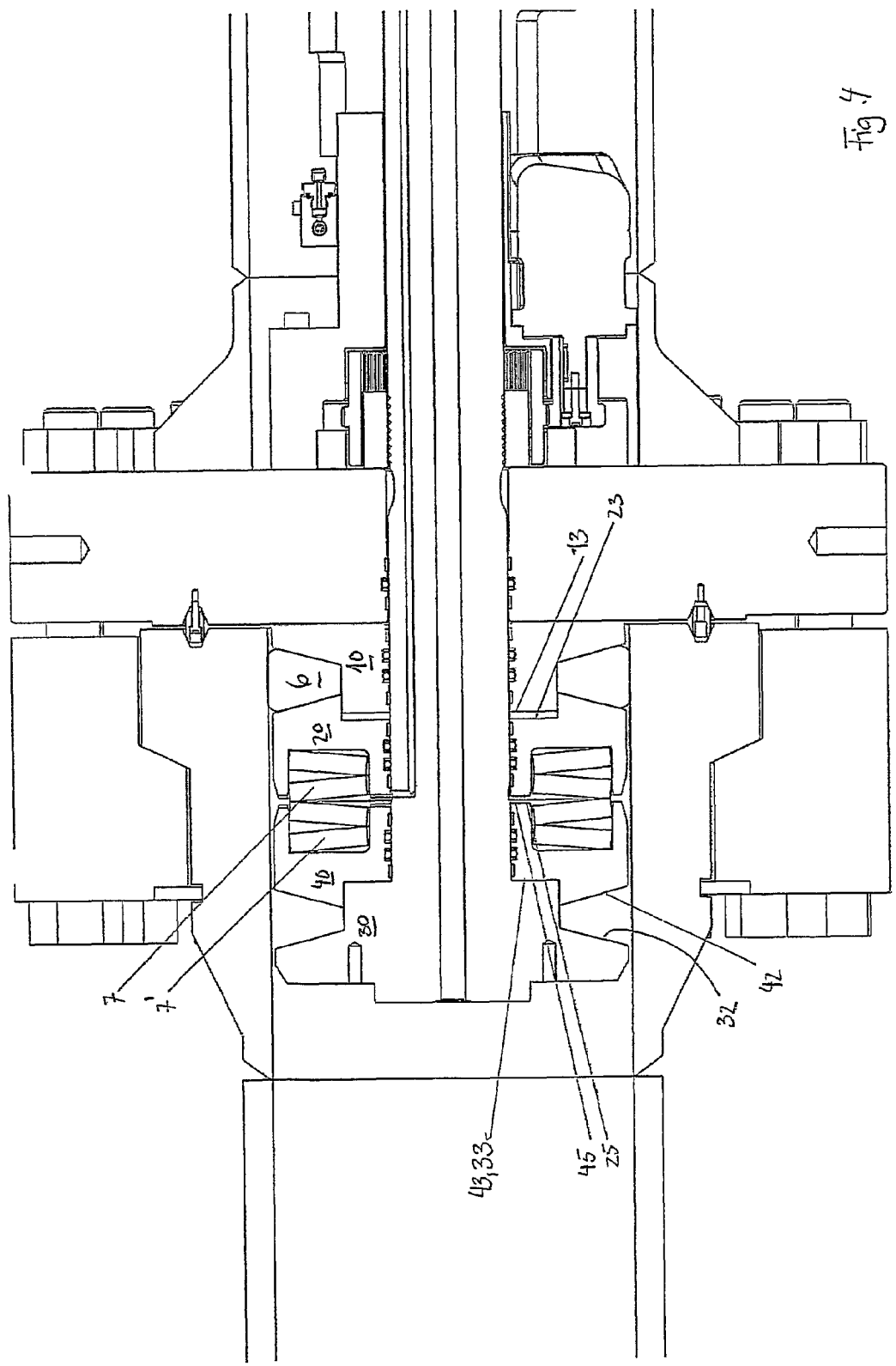
Figure 5:
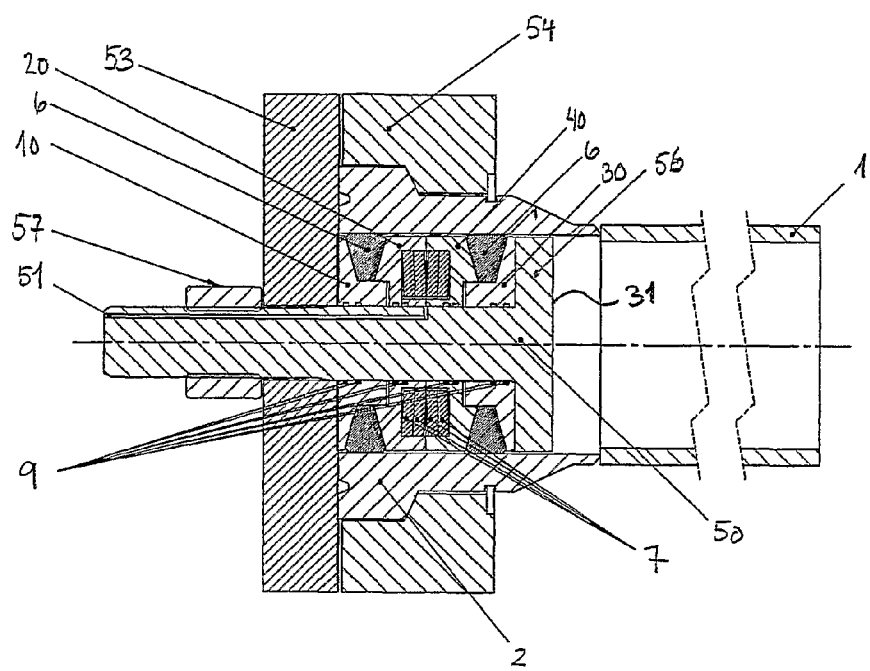
Figure 6:
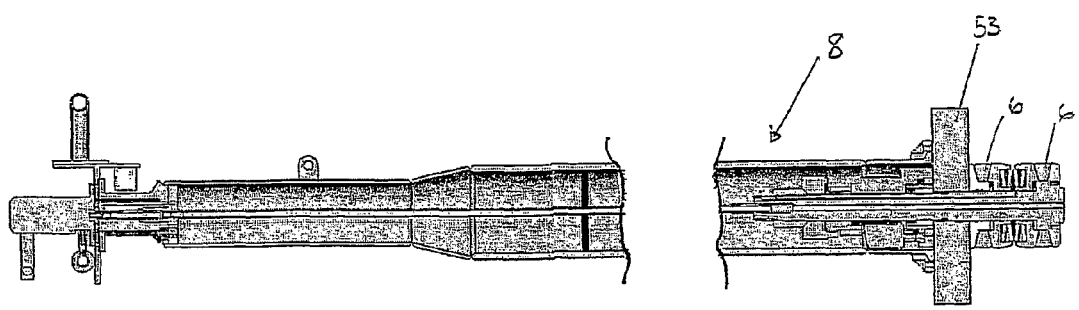

The invention will now be explained in further detail with non-limiting embodiments of the invention with references to the accompanying drawings, where;

FIG. 1 shows a first embodiment of the invention in a set position at an end of a pipeline, FIG. 2 shown a second embodiment of the invention in a set position at an end of a pipeline, FIG. 3 shows a third embodiment of the invention in a set position at an end of a pipeline, FIG. 4 shows a different situation for the third embodiment as depicted in FIG. 3, FIG. 5 gives a sketch of a fourth embodiment of the invention set at an end of a pipeline, and FIG. 6 shows the embodiment of FIG. 3 in an unset position outside a pipeline.

Similar elements within all the embodiments are givens the same reference numerals in all embodiments.

FIG. 1 shows a first embodiment of a plug system 3 according to the invention positioned within a pipeline 1, at the end of this pipeline 1 in connection with an end comprising a pipe hub 2. The plug system 3 is shown in a sat position within the pipeline 1, where a circumferential sealing means 6 in the form a packer is pressed into sealing contact against the inner wall 4 of the pipeline 1, sealing the interior of the pipeline 1 from the outside of the pipeline 1. The system according to the invention will work independent whether there is a higher pressure outside or inside the pipeline 1 or equal pressure on the different sides.

The plug system 3 comprises a plug body, comprising as shown in FIG. 1 three plug body elements 10, 20, 30. The first plug body element 10, facing and or exposed to the fluid pressure on the outside of the pipeline 1 comprises a first end surface 11 exposed to the surrounding fluid, a first pressing surface 12 abutting a surface of the sealing means 6, a first stopping surface 13 and a transition surface 14. The first transition surface 14 is arranged as a circumferential surface facing outwards and abutting a radial inner surface of the sealing means 6. The first stopping surface 13 is a surface extending in a radial direction and facing in the opposite axial direction compared with the first end surface 11.

On the opposite site of the sealing means 6 there is arranged a second plug body element 20, with a second pressing surface 22 abutting an opposite side of the sealing means 6 compared with the first pressing surface 12 of the first plug body element 10. The second plug body element comprises further a second stopping surface 23 and a second transition surface 24. The second transition surface 24 is arranged as a circumferential oriented surface, facing inwards against the first transition surface 14, making these surface move relative each other in a axial direction when setting and releasing the plug system 3. The second stopping surface 23 is facing the first stopping surface 13. On the opposite side of the second plug body element 20 it comprises an abutting surface 25 and in this abutting surface there is made a cut-out or a groove 26, for positioning of an elastic element 7.

This elastic element 7 is arranged pretensioned between the second body element 20 and a third body element 30, and an abutting surface 35 of the third body element 30. The third body element in this embodiment comprises on the opposite side of the abutting surface 35 a second end surface 31 facing the fluid within the pipeline.

The third plug body element 30 is in this embodiment formed in one piece with a stem 50 of the setting tool 8 for setting the plug system 3 in a sealing manner within the pipeline 1. The stem 50 is thereby moved together with the third plug body element 30, and run in the middle of the second plug body element 20 and first plug body element 10. The first and second plug body elements 10, 20 are allowed to move relative the stem 50, and there are arranged sealing elements 9 between the stem 50 and these plug body elements 10, 20.

The stem 50 is further run through an end flange 53. This end flange 53 is arranged abutting against an end surface 5 of the end hub 2 of the pipeline 1. The end flange 53 is locked to the end hub 2 by a locking elements 54 and a bolt connection 55, keeping the end flange 53 still or fixated relative to the pipeline 1. The stem 50 is arranged movable through the end flange 53, with sealing elements 9 between the stem 50 and the end flange 53. The setting tool further comprises setting means for moving the stem 50 relative the end flange 53 for setting and releasing the plug system, which setting means in a set position of the plug system 3 also will allow movement of the stem 50 in one direction but prevent movements in the opposite direction, the allowable direction being in a direction running from the second end surface 31 to the first end surface 11 of the plug system 3, which movement only will tighten the plug system 3 further by pressing it towards the end flange 53, which is locked relative the pipeline. This will happen if there is a larger pressure within the pipeline than outside the pipeline. The setting means will lock the stem 50 from moving relative the end flange 53 in the opposite direction in a set position of the plug system 3. When there is a larger pressure outside the pipeline, the fluid pressure will act on the first end surface 11 and where the stem is prevented from moving relative to the end flange in that direction by the setting means, giving pressure on the sealing means.

The stem 50 may as indicated comprise a through going fluid line 52 through the plug system connecting the inside of the pipeline with the outside of the pipeline, with for instance a valve (not shown) in the line for controlling any flow through the fluid line.

In FIG. 2 there is shown a plug system similar to the embodiment shown in FIG. 1, but somewhat simplified. The elements are shown mirrored compared with FIG. 1, i.e. the high pressure side may be to the left or right in the figures. Similar elements are given the same reference numeral. Only the differences from FIG. 1 will be explained.

In FIG. 2 the plug system 3 comprises only two plug body elements 10, 30. The sealing means in the form of a packer 6 is arranged between these two plug body elements 10, 30 between the first pressing surface 12 and the third pressing surface 32. The two plug body elements also comprise stop and transition surfaces with a similar configuration as explained above. The tensioning device 7 is in this embodiment positioned between the first plug body element 10 and the end flange 53 of the setting means, tending to move the two pressing surfaces 12, 32 towards each other. The tensioning device 7 is arranged in a groove 16 formed in the first end surface 11, which end surface 11 will abut a surface of the end flange 53, but be exposed to fluid, which is fixated relative the pipe 1.

In FIG. 3 there is shown a plug system similar to the embodiment shown in FIG. 1, but with two sealing means 6, forming a double barrier. The figure show only half of the system, and the elements are shown mirrored compared with FIG. 1. Only the differences from FIG. 1 will be explained.

There is a fourth plug body element 40 arranged between the third plug body element 30 and the second plug body element 20. The abutting surface 25 of the second plug body elements is arranged facing an abutting surface 45 of the fourth plug body element. This abutting surface 45 comprises a groove 46 for positioning of a second elastic element 7. On the opposite side of the fourth plug body element 40 it comprises a fourth pressing surface abutting against the second packer 6, a transition surface 44, and a stopping surface 43. The third plug body element 30 comprises in this embodiment a third pressing surface 32, a transition surface 34 and a stopping surface 33. The arrangement of the surfaces of the third and forth plug body element, 30, 40 around the second packer 6 is similar to that around the first packer element 6 as explained above in relation to FIG. 1. The first, second and fourth plug body element 10, 20, 40 are separately movable relative the stem 50 with a similar solution for the setting tool with setting means as in the embodiment in FIG. 1.

The stem 50 of the setting tool may comprise a through going fluid line 52 as also indicated in the embodiment in FIG. 1. In addition there may be a fluid line 51 leading to a position between the two sealing means 6 for instance as shown leading to the grooves 46, 26 for the elastic elements 7. The fluid line 51 may be used for pressure testing of the two sealing means 6.

In FIG. 4 there is shown an embodiment similar to that in FIG. 2. However in this embodiment there are no second packer between the third pressing surface 32 and the fourth pressing surface 42, giving that the third stopping surface 33 is abutting the fourth stopping surface 43, i.e. the stopping surfaces are active opposite to the first 13 and second 23 stopping surface which are positioned with a distance from each other also in a set position of the plug system. Active stopping surfaces as shown with the stopping surfaces 43, 33 will also work if a packer element malfunctions or is damaged. In this and such a case the elastic elements 7 will work and press the pressing surfaces 32 and 42 towards each other until the stopping surface 33, 43 are abutting against each other. The elastic elements 7 will still act on the packer element 6 which is positioned and active within the plug system 3.

In FIG. 5 there is show a different embodiment with two sealing element 6 or packers. In this embodiment the stem 50 is formed with a flange part 56 separate from a third plug body element 30. In this the flange part 56 of the stem 50 forms the second end surface 31 of the plug system, with an abutting surface between the flange part 56 and the third plug body element 30, and sealing elements 9 between the third plug body element 30 and the stem 50. The stem 50 is in this embodiment formed with a threaded outer surface of a part of the stem 50 which protrude at the outside of the end flange 53. This threaded part is connected with a locking nut 57, working as the setting means of the setting tool, locking the movement of the stem 50 relative the pipeline 1 in one direction.

In FIG. 6 there is shown a different kind of setting tool 8. A skilled person will understand that there may be used different kinds of setting tool to set a plug system according to the invention.

The invention has now been explained with different non-limiting embodiments with reference to the enclosed drawings. A skilled person will understand that there may be made several alterations and modifications to the explained embodiments that are within the scope of the invention as defined in the following claims. There may be more than four plug body elements, the stem may be formed as a part of a plug body element, attached to or with a flange part forming a plug body element, the elastic element may be different kind and there may be one common elastic element arranged in two facing grooves in two different plug body elements. If there are no need for a sealing arrangement that can be double sided independent on which side has the higher pressure there may be arranged only two plug body element with the elastic element between one plug body element and the end flange, instead of the end flange and elements locking this relative the pipeline, a skilled person will understand that one can lock an elements relative a pipeline with different internal gripping means as for instance slips and thereby get a plug system that can be operated within the pipeline, independent of a end hub or end flange of a pipe, by this one gets an internal plug system that may be used to seal off between two parts of a pipeline.

The invention claimed is:

1. Barrier plug system for sealing off a pipe, comprising:
a plug body having at least two separate plug body elements movable relative to each other;
a first and a second end plate surface arranged on opposite sides of the plug body;
at least one circumferential sealing means; and
means for setting the plug system within a pipe by moving the end plate surfaces towards each other;
wherein the end plate surfaces are arranged on two different elements movable relative each other, and the at least one sealing means is arranged abutting two opposite annular pressing surfaces formed by the plug body, which are moved towards each other during setting of the plug system, and the pressing surfaces are limited in the movement against each other by a stop means and pre-tensioned to move toward each other by at least one tensioning device, said tensioning device arranged between at least one of the plug body elements and an element able to be fixated relative the pipe and said plug body having at least three separate plug body elements and the at least one tensioning device is arranged between two elements of the plug body.

2. Plug system according to claim 1, said plug body comprising two of said separate plug body elements arranged between said two sealing means, with at least one tensioning device arranged between the two plug body elements.

3. Plug system according to claim 1, further comprising an anchoring device attached to said plug system, for fixating of said plug system relative to a pipe.

4. Plug system according to claim 3, said anchoring device comprising an end flange fixable relative the pipe, by being attachable to an end flange of a pipe.

5. Plug system according to claim 3, said anchoring device comprising a gripping means for gripping an internal wall of the pipe.

6. Plug system according to claim 5, said gripping means comprising a slip movable along a conical surface for radial movement.

7. Plug system according to claim 1, said tension device comprising an elastic element.

8. Plug system according to claim 1, said tension device comprising a fluid cylinder.

9. Barrier plug system for sealing off a pipe, comprising:
a plug body having at least two separate plug body elements movable relative to each other;
a first and a second end plate surface arranged on opposite sides of the plug body;
at least one circumferential sealing means; and
means for setting the plug system within a pipe by moving the end plate surfaces towards each other;
wherein the end plate surfaces are arranged on two different elements movable relative each other, and the at least one sealing means is arranged abutting two opposite annular pressing surfaces formed by the plug body, which are moved towards each other during setting of the plug system, and the pressing surfaces are limited in the movement against each other by a stop means and pre-tensioned to move toward each other by at least one tensioning device, said tensioning device arranged between at least one of the plug body elements and an element able to be fixated relative the pipe and said at least one of the plug body elements interacting with a tensioning means, comprising a groove for arranging the tensioning means, making a surface of the plug body element around the tensioning means abut against the adjacent element in a normal setting of the plug system.

10. Plug system according to claim 1, said stop means comprising two stop surfaces each formed on one of the two elements forming the two cooperating pressing surfaces around one sealing means, said stop surfaces arranged radial within the pressing surfaces and abutting against each other when functioning as a stop means.

11. Plug system according to claim 10, further comprising the pressing surface and the stop surface of one plug body element connected by a transition surface, wherein the transition surface extends mainly parallel with a longitudinal axis of the plug system and the stop surface extends in a mainly radial direction.

12. Plug system according to claim 10, further comprising the transition surface of one of two co-operating plug body elements around one sealing means forming an outward facing surface and the transition surface of the other plug body element forming an inward facing surface.

13. Plug system according to claim 1, said means for setting the system comprising a mechanically operated setting tool.

14. Plug system according to claim 1, said means for setting the system comprising a fluid operated setting tool.

15. Plug system according to claim 13, said setting tool comprising at least one stem extending between the setting means of the setting tool and the plug body element having the second end plate surface and the other plug body elements arranged separately movable along the at least one stem between the plug body element and the setting tool.

16. Plug system according to claim 15, said at least one stem comprising a fluid line, connecting the area between the two sealing means with a source of fluid at one end of the plug system.

17. Plug system according to claim 15, said at least one stem comprising a through going fluid channel through the plug system.

* * * * *